(12) United States Patent
Lytle

(10) Patent No.: US 7,677,200 B2
(45) Date of Patent: Mar. 16, 2010

(54) DOGGIE FOUNTAIN

(76) Inventor: Anthony Lytle, 7468 W. Division Rd., Larwill, IN (US) 46764

( * ) Notice: Subject to any disclaimer, the term of this patent is extended or adjusted under 35 U.S.C. 154(b) by 180 days.

(21) Appl. No.: 11/818,458

(22) Filed: Jun. 14, 2007

(65) Prior Publication Data
US 2008/0163821 A1     Jul. 10, 2008

Related U.S. Application Data

(60) Provisional application No. 60/883,424, filed on Jan. 4, 2007.

(51) Int. Cl.
*A01K 7/06*     (2006.01)
(52) U.S. Cl. .................... 119/76; 239/29.5
(58) Field of Classification Search ............... 119/72, 119/74, 75, 76; 239/29.5, 28, 24, 25, 29, 239/29.3; 251/295
See application file for complete search history.

(56) References Cited

U.S. PATENT DOCUMENTS

| 610,707 | A | * | 9/1898 | Heckaman | 119/76 |
| 1,539,740 | A | * | 5/1925 | Johnson | 119/76 |
| 2,245,934 | A | * | 6/1941 | Mullett | 4/624 |
| 3,272,181 | A | * | 9/1966 | Ramsey | 119/76 |
| 4,469,049 | A | * | 9/1984 | Waynick | 119/76 |
| 4,729,414 | A | * | 3/1988 | Beber | 141/250 |
| 4,924,812 | A | | 5/1990 | Bernays, Jr. | |
| 5,125,623 | A | | 6/1992 | Kiedinger | |
| 5,582,132 | A | | 12/1996 | Morton | |
| 6,202,594 | B1 | | 3/2001 | Kirschner | |
| 6,279,508 | B1 | | 8/2001 | Marchant et al. | |
| 6,526,916 | B1 | * | 3/2003 | Perlsweig | 119/74 |

FOREIGN PATENT DOCUMENTS

FR     2369793 A * 7/1978
WO     WO 9322906 A1 * 11/1993

* cited by examiner

*Primary Examiner*—Rob Swiatek
*Assistant Examiner*—Kristen C Hayes
(74) *Attorney, Agent, or Firm*—James Ray & Assoc

(57) ABSTRACT

An apparatus engageable with a water source for providing dogs access to fresh, clean water. The apparatus comprises a base member and a housing member engageable with an upper surface of the base member. Such housing member has a predetermined configuration and is formed of a predetermined material. At least one tubular member is disposed within the housing member, a first end of the at least one tubular member extends outwardly from a bottom portion of the housing member for engagement with such source of water and a second end of the at least one tubular member extends outwardly through an upper surface of the housing member. A water valve is disposed within the at least one tubular member for controlling water flow. There is a paddle member that is engageable with the water valve for activating the water valve and permitting water to flow from the second end of the at least one tubular member and for deactivating the water valve so as to stop a flow of water from the second end of the at least one tubular member.

12 Claims, 4 Drawing Sheets

DOGGIE FOUNTAIN

CROSS REFERENCE TO RELATED APPLICATIONS

This application is closely related to and claims benefit from U.S. Provisional Application Ser. No. 60/883,424 filed Jan. 4, 2007.

FIELD OF THE INVENTION

The present invention relates, in general, to a fountain, and, more particularly, the present invention relates to a fountain that is used by dogs so as to provide water for such dog whenever such dog needs water.

BACKGROUND OF THE INVENTION

While it is possible for pets to go without food for a period of time, such pets need to be hydrated frequently. Just like humans who do not like to drink hot, stale dirty water, pets should not be required to do so either. Unfortunately, dogs are typically left alone while their owner is at work, or is away for other lengthy obligations with only a bowl of water to drink. If the pet inadvertently knocks this bowl over, or even drinks it all, the pet is left without access to water until the owner returns. In addition, dogs that are kept outdoors can be left without water due to evaporation. They are also at risk of more easily becoming dehydrated due to constant exposure to the hot temperatures.

Thus, it would be advantageous if there were an apparatus or a means that such pet could obtain water as needed without the need for someone to provide the water.

SUMMARY OF THE INVENTION

The present invention provides an apparatus engageable with a water source for providing dogs access to fresh, clean water. The apparatus comprises a base member and a housing member engageable with an upper surface of the base member. Such housing member has a predetermined configuration and is formed of a predetermined material. At least one tubular member is disposed within the housing member, a first end of the at least one tubular member extends outwardly from a bottom portion of the housing member for engagement with such source of water and a second end of the at least one tubular member extends outward through an upper surface of the housing member. A water valve is disposed within the at least one tubular member for controlling water flow. There is a means that is engageable with the water valve for activating the is water valve and permitting water to flow from the second end of the at least one tubular member and for deactivating the water valve so as to stop a flow of water from the second end of the at least one tubular member.

OBJECTS OF THE INVENTION

It is, therefore, one of the primary objects of the present invention to provide an apparatus that will provide dogs access to fresh, clean water.

Another object of the present invention to provide an apparatus for providing water to a dog that is controlled by the dog.

Still another object of the present invention to provide an apparatus that is simple for the dog to operate.

Yet another object of the present invention to provide an apparatus that is relatively inexpensive.

In addition to the various objects and advantages of the invention which have been described in some specific detail above it should be noted that various other objects and advantages of the present invention will become more readily apparent to those persons who are skilled in the relevant art from the following more detailed description, particularly when such description is taken in conjunction with the appended claims.

Figure 1:
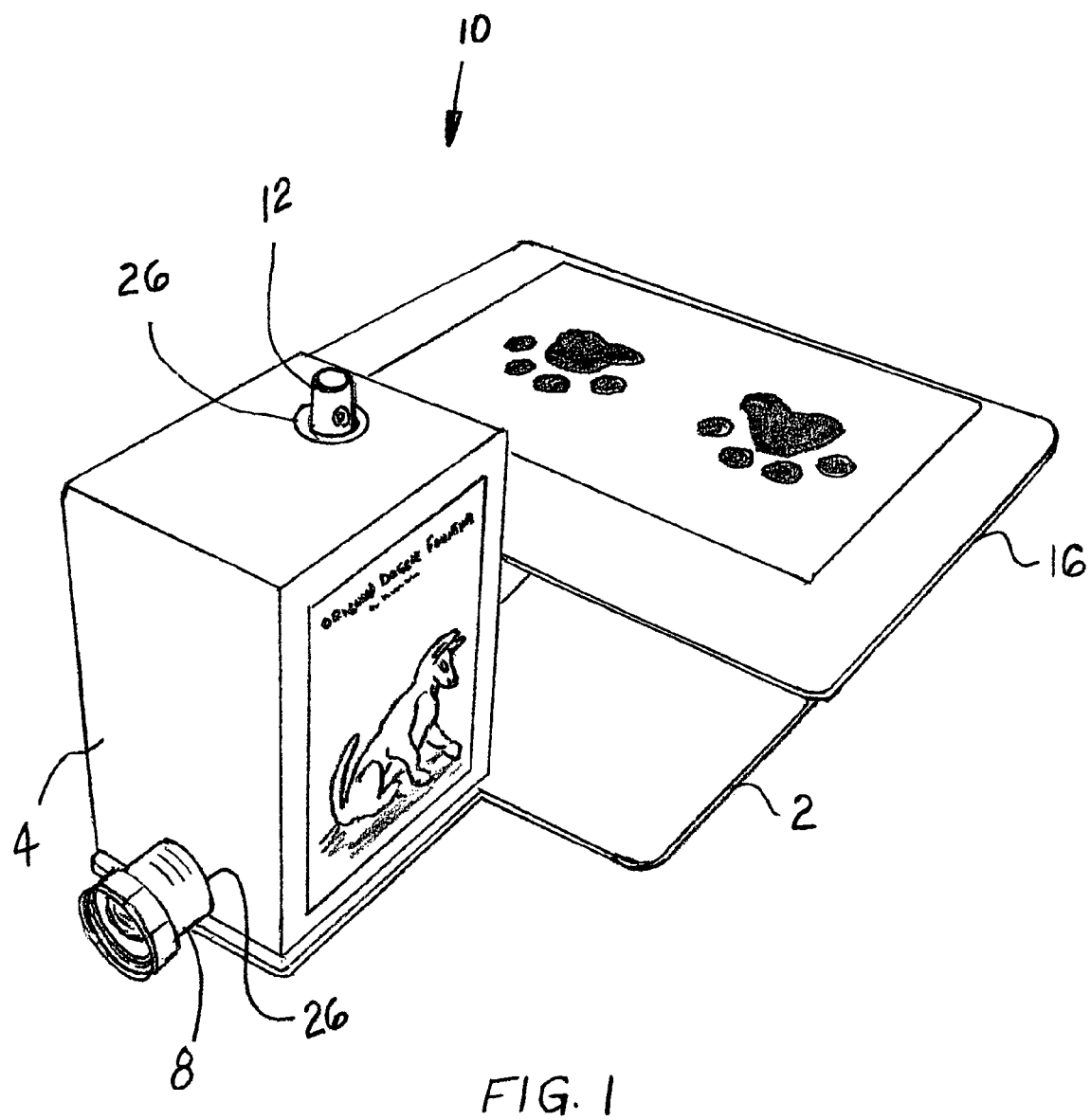
FIG. 1 is a perspective view of the apparatus according to an embodiment of the invention.

BRIEF DESCRIPTION OF THE PRESENTLY PREFERRED AND VARIOUS ALTERNATIVE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

In a first aspect the present invention, as seen in FIGS. 1-4, there is provided an apparatus, generally designated 10, engageable with a water source for providing dogs access to fresh, clean water. The apparatus 10 comprises a base member 2 and a housing member 4 that is engageable with an upper surface of the base member 2. Such housing member 4 has a predetermined configuration and is formed of a predetermined material. At least one tubular member 6 is disposed within the housing member 4. A first end 8 of the at least one tubular member 6 extends outwardly from a bottom portion of the housing member 4 for engagement with such source of water and a second end 12 of the at least one tubular member 6 extends outwardly through an upper surface of the housing member 4. A water valve 14 is disposed within the at least one tubular member 6 for controlling water flow. There is a means, generally designated 20, that is engageable with the water valve 14 for activating the water valve 14 and permitting water to flow from the second end 12 of the at least one tubular member 6 and for deactivating the water valve 14 so as to stop a flow of water from the second end 12 of the at least one tubular member 6.

Figure 4:
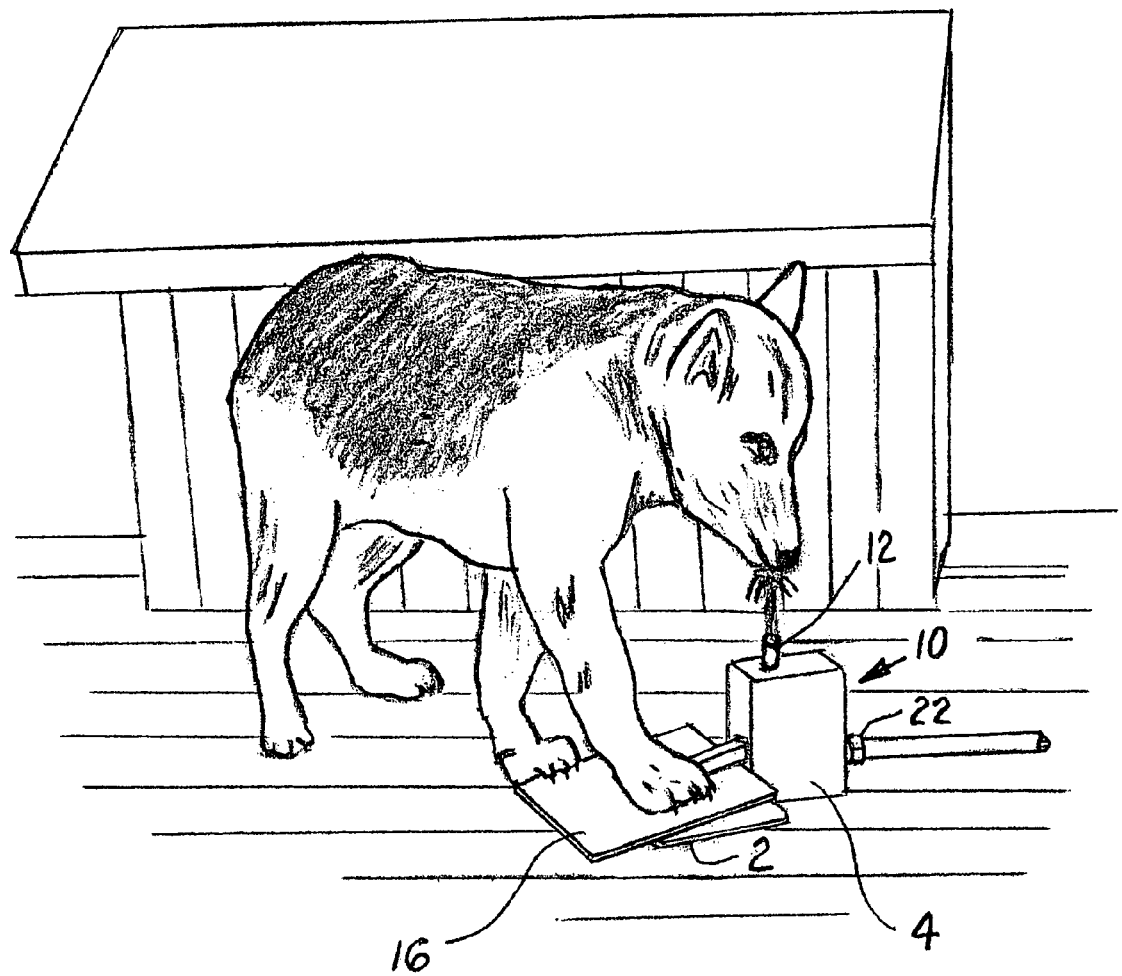
FIG. 4 is a perspective view of the apparatus showing the dog operating the apparatus.

It is presently preferred that such means 20 includes a paddle member 16 that activates the water valve 14 when the paddle member 16 is depressed and deactivates the water valve 14 when the paddle member 16 is not depressed. Thus, the dog can be trained easily to step on the paddle member 16, as seen in FIG. 4, and have water flow out of the second end 12 of the tubular member. When the dog steps off of the paddle member 16 the flow of water ceases.

Such means 20 includes a biasing means, generally designated 30, that returns the paddle member 16 to an original position when the paddle member 16 is no longer depressed. It is presently preferred that such biasing means 30 is a spring 18 and even more preferred that there are two radially opposed springs 18. The two springs 18 are engaged on first end with the base member 2 and on a second end with the paddle member 16. Thus when the dog steps on the paddle member 16 the springs 18 are extended but when the dog no longer puts pressure on the paddle member 16 the springs contract to their original position and force the paddle member 16 to its original position and water flow is shut off.

It is also presently preferred that such water source is a garden hose since this apparatus 10 is designed primarily for outdoor use. As such, the first end 8 of at the least one tubular member 6 that extends outwardly from a bottom portion of the housing member for engagement with the source of water includes a hose coupler 22.

Such predetermined material for forming the housing member 4 is selected from one of aluminum, plastic and combinations thereof. plastic. The base member 2 and the paddle member 16 are also selected from one of aluminum, plastic and combinations thereof. plastic. It is presently preferred that the housing member 4, the base member 2 and the paddle member 16 are made of aluminum.

Figure 2:
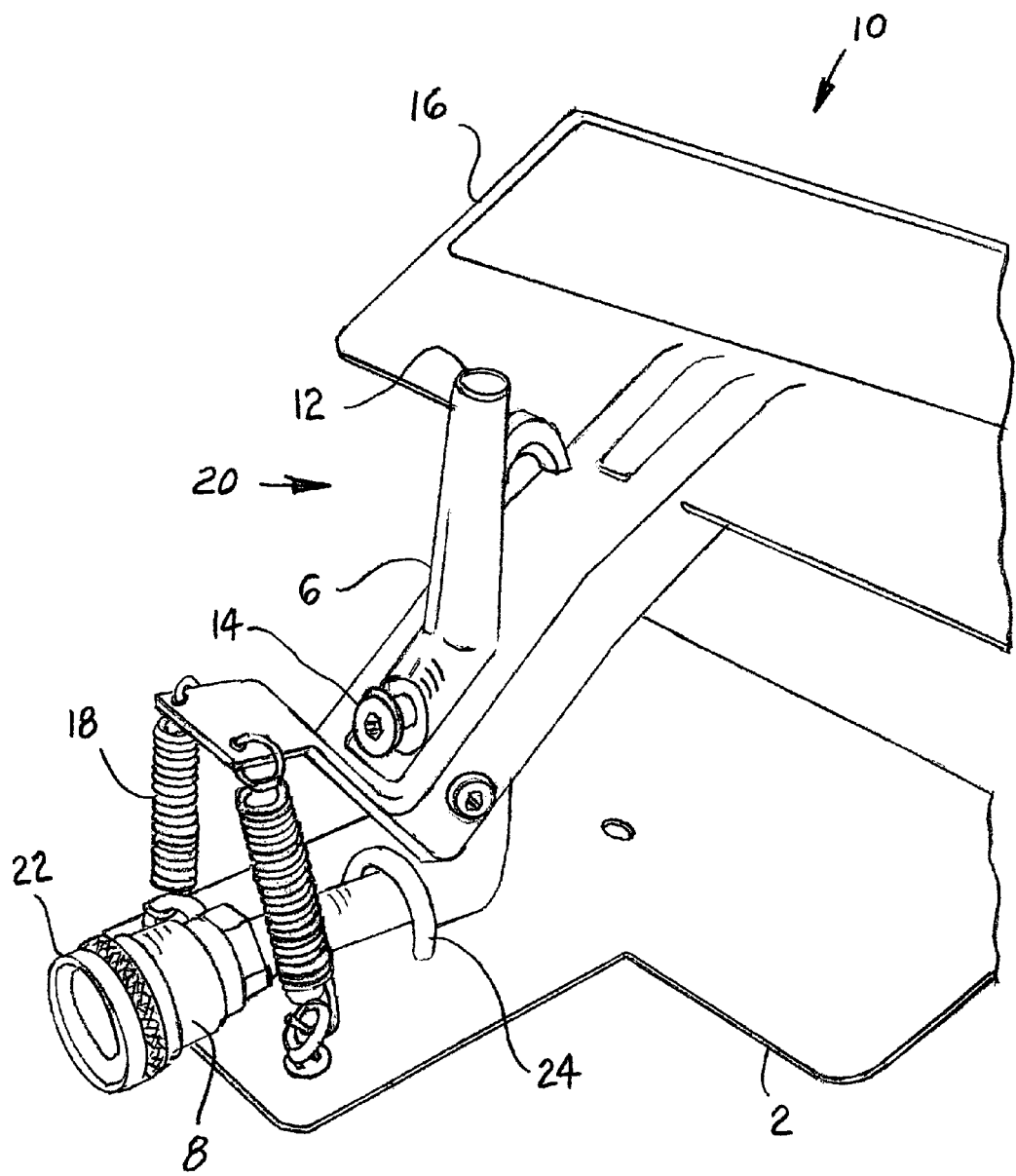
FIG. 2 is a is a perspective view of the apparatus as shown in FIG. 1 with the housing removed so that the interior of the apparatus can be seen.
Figure 3:
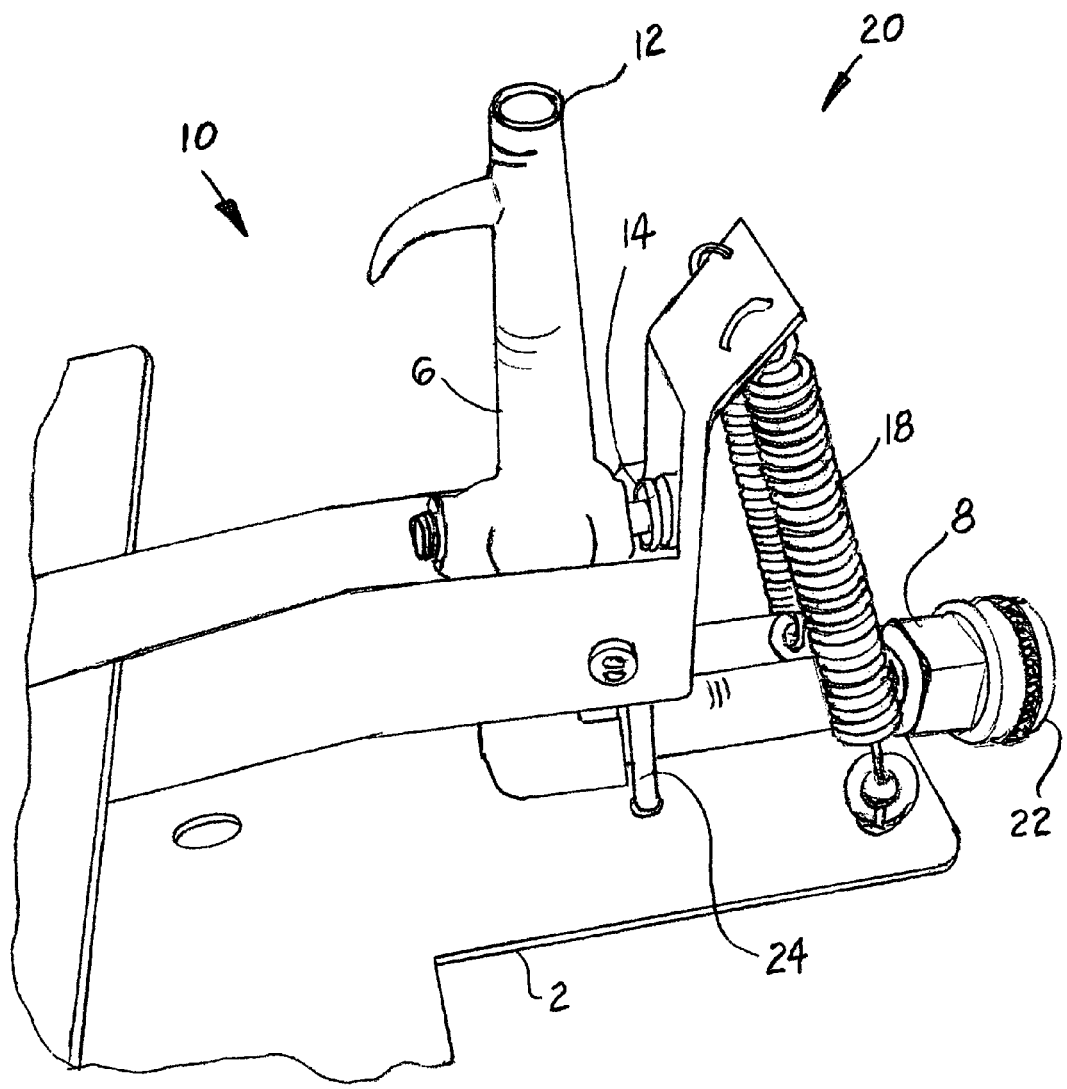
FIG. 3 is a perspective view of the interior of the housing from a different angle showing the spring extended as it would be when the dog presses on the paddle member.

As seen in FIGS. 2 and 3 at least a portion of the at least one tubular member 6 is secured to the base member 2 by means of a U-bolt 24.

Also the predetermined configuration of the housing member includes an aperture 26 on a bottom portion of the hosing member for permitting the first end 8 of the at least one tubular member 6 to extend outwardly therefrom and also the predetermined configuration of the housing member 4 further includes a second aperture 26 on an upper surface thereof for permitting the second end 12 of the at least one tubular member 6 to extend outwardly therefrom.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. An apparatus engageable with a water source for providing dogs access to fresh, clean water, said apparatus comprising:
   (a) a base member;
   (b) a housing member engageable with an upper surface of said base member having a predetermined configuration and formed of a predetermined material, an entire upper surface of said housing member being flat;
   (c) at least one tubular member disposed within said housing member, a first end of said at least one tubular member extending outwardly from a bottom portion of said housing member for engagement with said source of water and a second end of said at least one tubular member extending through said flat upper surface of said housing member;
   (d) a water valve disposed within said at least one tubular member; and
   (e) a means engageable with said water valve for activating said water valve and permitting water to flow from said second end of said at least one tubular member and for deactivating said water valve so as to stop a flow of water from said second end of said at least one tubular member, said means including a paddle member adjoining a side of said housing member.

2. The apparatus, according to claim 1, wherein said paddle member activates said water valve when said paddle member is depressed in a first position and deactivates said water valve when said paddle member is returned to an original position.

3. The apparatus, according to claim 2, wherein said paddle member includes a biasing means connected at a first end to said base member and at a second end to said paddle member for returning said paddle member to said original position.

4. The apparatus, according to claim 3, wherein said biasing means is a spring.

5. The apparatus, according to claim 3, wherein said biasing means includes two radially opposed springs.

6. The apparatus, according to claim 1, wherein said first end of said at least one tubular member extending outwardly from a bottom portion of said housing member for engagement with said source of water includes a hose coupler.

7. The apparatus, according to claim 1, wherein said predetermined material for forming said housing member is selected from on of aluminum, plastic and combinations thereof.

8. The apparatus, according to claim 7, wherein said predetermined material for forming said housing member is aluminum.

9. The apparatus, according to claim 1, wherein a portion of said at least one tubular member is secured to said base member by means of a U-bolt.

10. The apparatus, according to claim 1, wherein said predetermined configuration of said housing member includes an aperture on a bottom portion of said housing member for permitting said first end of said at least one tubular member to extend outwardly therefrom.

11. The apparatus, according to claim 1, wherein said predetermined configuration of said housing member further includes an aperture on an upper surface thereof for permitting said second end of said at least one tubular member to extend outwardly therefrom.

12. An apparatus engageable with a water source for providing dogs access to fresh, clean water, said apparatus comprising:
   (a) a base member;
   (b) a housing member engageable with an upper surface of said base member having a predetermined configuration and formed of a predetermined material, an entire upper surface of said housing member being flat;
   (c) at least one tubular member disposed within said housing member, a first end of said at least one tubular member extending outwardly from a bottom portion of said housing member for engagement with said source of water and a second end of said at least one tubular member extending through said flat upper surface of said housing member, wherein a portion of said at least one tubular member is secured to said base member by means of a U-bolt;
   (d) a water value disposed within said at least one tubular member; and
   (e) a means engageabla with said water valve for activating said water valve and permitting water to flow from said second end of said at least one tubular member and for deactivating said water valve so as to stop a flow of water from said second end of said at least one tubular member.

* * * * *